United States Patent [19]
Ganesan

[11] Patent Number: 5,905,799
[45] Date of Patent: *May 18, 1999

[54] PROGRAMMED COMPUTER FOR IDENTITY VERIFICATION, FORMING JOINT SIGNATURES AND SESSION KEY AGREEMENT IN AN RSA PUBLIC CRYPTOSYSTEM

[75] Inventor: Ravi Ganesan, Arlington, Va.

[73] Assignee: Bell Atlantic Network Services, Inc., Arlington, Va.

[ * ] Notice: This patent is subject to a terminal disclaimer.

[21] Appl. No.: 08/731,428

[22] Filed: Oct. 15, 1996

Related U.S. Application Data

[63] Continuation-in-part of application No. 08/277,808, Jul. 20, 1994, Pat. No. 5,588,061.

[51] Int. Cl.$^6$ .................................................. H04L 9/30
[52] U.S. Cl. ................................ 380/21; 380/30; 380/49
[58] Field of Search ................................ 380/30, 21, 49

[56] References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,405,829 | 9/1983 | Rivest et al. . |
| 4,424,414 | 1/1984 | Hellman et al. . |
| 4,736,423 | 4/1988 | Matyas . |
| 4,995,082 | 2/1991 | Schnorr . |
| 5,276,737 | 1/1994 | Micali . |
| 5,299,263 | 3/1994 | Beller et al. . |
| 5,375,169 | 12/1994 | Seheidt et al. . |
| 5,588,061 | 12/1996 | Ganesan et al. ........................ 380/30 |

OTHER PUBLICATIONS

R.L. Rivest et al., "A Method for Obtaining Digital Signatures and Public–Key Cryptosystems", CACM, vol. 21, pp. 120–126, Feb. 1978.
M.J. Wiener, "Cryptoanalysis of Short RSA Secret Exponents", IEEE Transaction on Information Theory, vol. 36, No. 3, pp. 553–558.
C. Boyd, Cryptography and Coding: "Digital Multisignatures", Dec. 15–17, 1986, pp. 241–246.
Bruce Schneier, "Applied Cryptography", John Wiley & Sons, 1994, Chap. 3.4 and 16.3 and p. 576.

*Primary Examiner*—Gilberto Barrón, Jr.
*Attorney, Agent, or Firm*—McDermott, Will & Emery

[57] ABSTRACT

An article of manufacture for improving an RSA cryptosystem, includes computer readable storage medium with computer programming stored thereon. The stored computer programming is configured to be readable from the computer readable storage medium by a computer and thereby cause the computer to operate so as to generate a private exponent key, having an associated modulus N of a predetermined bit length and a bit length of no greater than fifteen percent of the bit length of the associated modulus N but not less than 56 bits, and a corresponding public exponent key, to divide the private exponent key into a first private key portion and a second private key portion, to direct said first private key portion to a first user, and to direct the second private key portion to one or more other users of the RSA system.

20 Claims, 7 Drawing Sheets

PROGRAMMED COMPUTER FOR IDENTITY VERIFICATION, FORMING JOINT SIGNATURES AND SESSION KEY AGREEMENT IN AN RSA PUBLIC CRYPTOSYSTEM

RELATED APPLICATIONS

This application is a continuation-in-part of application Ser. No. 08/277,808, filed Jul. 20, 1994 now U.S. Pat. No. 5,588,061.

BACKGROUND OF INVENTION

1. Field of the Invention

This invention relates to Rivest, Shamir and Adleman (RSA) public cryptosystems and more particularly to a computer and computer programming for identity verification, forming joint signatures, and session key agreement in an RSA type system.

2. Description of the Related Art

Encryption systems have been developed for maintaining the privacy of information transmitted across a communications channel. Typically, a symmetric cryptosystem is used for this purpose. Symmetric cryptosystems, which utilize electronic keys, can be likened to a physical security system where a box has a single locking mechanism with a single key hole. One key holder uses his/her key to open the box, place a message in the box and relock the box. Only a second holder of the identical copy of the key can unlock the box and retrieve the message. The term symmetric reflects the fact that both users must have identical copies of the key.

In more technical terms, a symmetric cryptosystem uses an encryption function E, a decryption function D, and a shared secret-key, K. The secret-key is a unique string of data bits to which the functions are applied. Two examples of encipherment/deencipherment functions are the National Bureau of Standards Data Encryption Standard (DES) and the more recent Fast Encipherment Algorithm (FEAL). To transmit a message, M, in privacy, the sender computes M=E (C,K), where C is referred to as the ciphertext. Upon receipt of C, the recipient computes M=D (C,K), to recover the message M. An eavesdropper who copies C, but does not know K, will find it practically impossible to recover M. Typically, all details of the enciphering and deciphering functions, E and D, are well known, and the security of the system depends solely on maintaining the secrecy of key, K. Conventional symmetric cryptosystems are fairly efficient and can be used for encryption at fairly high data rates, especially if appropriate hardware implementations are used.

Asymmetric cryptosystems, often referred to as public key cryptosystems, provide another means of encrypting information. Such systems differ from symmetric systems in that, in terms of physical analogue, the box has one lock which accepts different keys. One key can be used to unlock the box to retrieve a message which has been locked in the box by the other key.

In public key electronic cryptosystems, each entity, for example, x and y, has a private key, d, which is known only to the entity, and a public key, e, which is publicly known. Once a message is transformed with a user's public-key, it can only be inverted using that user's private-key, and conversely, if a message is transformed with a user's private-key, it can only be inverted using that user's public-key. So, if sender x wishes to send a message to receiver y, then x, "looks-up" y's public key e, and computes $M=E(C, e_y)$ and sends it to y. User y can recover M using its private-key $d_y$, by computing $M=D(C, d_y)$. An adversary who makes a copy of C, but does not have $d_y$, cannot recover M. However, public-key cryptosystems are inefficient for large messages.

Public-key cryptosystems are quite useful for digital signatures. The signer, x, computes $S=D(M, d_x)$ and sends [M,S] to y. User y "looks-up" x's public-key $e_x$, and then checks to see if $M=D(S, e_x)$. If it does, then y can be confident that x signed the message, since computing S, such that $M=D(S, e_x)$, requires knowledge of $d_x$, x's private key which only x knows.

Public-key cryptography also provide a convenient way of performing session key agreement, after which the key that was agreed upon can be used for symmetric encryption. Typically, the key being exchanged is used during the course of a particular communication session and then destroyed, though this can vary depending on the application.

One public key cryptographic system is the Rivest, Shamir, Adleman (RSA) system, as described in Rivest, Shamir and Adleman, "A Method of Obtaining Digital Signatures and Public Key Cryptosystems, CACM, Vol 21, pp 120–126, February 1978. RSA is a public-key based cryptosystem that is believed to be very difficult to break. In the RSA system the pair $(e_i,N_i)$, is user i's public-key and $d_i$ is the user's private key. Here $N_i=pq$, where p and q are large properly chosen primes. Here also $ed=1 \bmod \phi(N_i)$, where $\phi(N_i)=(p-1)(q-1)$ which is the Euler Totient function which returns the number of positive integers less than $N_i$, that are relatively prime to $N_i$. A Carmichael function is sometimes used in lieu of a Euler Totient function.

To send a message to user j, user i can compute $C=M^{(e_j)} \bmod N_j$ and send C to user j. User j will then perform $M=C^{(d_j)} \bmod N_j$ to recover M. Alternatively, user i could sign the message using his private key. The RSA based signature of user i on the message, M, is $M^{d_i} \bmod N_i$. The recipient of the message, user j, can perform $(M^{(d_i)} \bmod N_i)^{(e_i)} \bmod N_i$, to verify the signature of i on M.

In a typical mode of operation, i sends j, $M^{(d_i)} \bmod N_i$ along with M and a certificate $C=(i,e_i,N_i)^{d_{CA}} \bmod N_{CA}$, where C is generated by a Certification Authority (CA) which serves as a trusted off-line intermediary. User j can recover i's public key from C, by performing $C^{(e_{CA})} \bmod N_{CA}$, as $e_{CA}$ and $N_{CA}$ are universally known. It should also be noted that in an RSA system the encryption and signatures can be combined.

Modifications to RSA systems have been proposed to enable multi-signatures to be implemented in a manner which only requires a single RSA transformation. The proposed approach extends the RSA system by dividing the user private key d into two portions, say $d_i$ and $d_j$, where $d_i * d_j = d \bmod \phi(N)$. Such a proposal is described in Digital Multisignature, C. Boyd, Proceedings of the Inst. of Math, and its Appl. on Cryptography and Coding, 15–17 December 1986.

However the problem remains that conventional RSA systems, including those modified as proposed, require that the secret exponent key d of a user be quite long. In the case where the secret exponent d is less than a quarter of the length of the modulus N, RSA is insecure, because it is too easy to invert the public operation without the secret key. Such a conclusion is discussed in M. J. Wiener "Cryptoanalysis of short RSA Secret Exponents, IEEE Trans. on IT, May 1990, Vol. 36, No. 3, pp. 553–558. Thus, according to Wiener, if the modulus N is 512 bits long, the secret exponent should have at least 128 bits. Accordingly, conventional RSA systems are not suitable for use in systems that do not provide a way to store the secret exponent key d.

e.g. in situations where the user has to memorize the secret exponent. This, for example, is the case when smart cards for storing the secret exponent are not widely available or when the user accesses the distributed system via a dumb terminal that does not have a disk drive for storing the secret exponent. Additionally, conventional RSA systems do not provide a way to establish and distribute session keys using split private keys.

Therefore, it is an object of the present invention to provide a programmable computer and computer programming instructions for improving conventional RSA public cryptosystems so that the user is only required to use a short secret key while the system provides security as high as that of conventional RSA systems.

It is another object of the invention to provide a programmable computer and computer programming instructions for improving conventional RSA cryptosystems it such that the identity of the user can be verified when the user is using a short secret key.

It is a further object of the invention to provide a programmable computer and computer programming instructions for improving conventional RSA cryptosystems such that joint signature of documents by two or more users is facilitated using a short secret key of a user.

It is a still further object of the present invention to provide a programmable computer and computer programming instructions to improve conventional RSA cryptosystems so that session key agreement can be accomplished using split private keys.

Additional objects, advantages and novel features of the present invention will become apparent to those skilled in the art from the following detailed, as well as by practice of the invention. While the invention is described below with reference to preferred embodiments, it should be understood that the invention is not limited thereto. Those of ordinary skill in the art having access to the teachings herein will recognize additional implementations, modifications and embodiments which are within the scope of the invention as disclosed and claimed herein and with respect to which the invention could be of significant utility.

SUMMARY OF THE INVENTION

According to the present invention, a programmed computer and computer programming are provided for improving an RSA cryptosystem. Computer programming stored on a tangible medium is read by a computer serving as a certification or security processor. The computer may be a personal computer, workstation or other type computing device. The programming causes the computer to generate a private exponent key having an associated modulus N and a corresponding public exponent key for a user or user group within an RSA system. The public exponent key is typically disclosed, or available for disclosure, to all users of the system. Pursuant to its programming instructions, the computer divides each private exponent key into a first key portion and a corresponding second key portion such that the bit length of the first key portion is no more than fifteen percent of the bit length of the associated modulus N but not less than 56 bits. For example, for a modulus N which is 512 bits in length, the computer, in accordance with its stored programming instructions, divides each private exponent key into a first key portion which is between 56 to 72 bits in length. The computer is then driven by the stored programming to transmit the first key portion to only a user and the second key portion to one or more selected other users of the RSA system depending on the application.

Computer programming stored on a tangible medium is read by the user's computer and causes the computer to transform a message by applying the first key portion thereto. Another user's computer, in accordance with its stored programming instructions, recovers the message by applying the corresponding second key portion and public exponent key to the transformed message.

Similarly, the other user's computer, in accordance with its stored programming instructions, may transform a message by applying the second key portion thereto. The user's computer, in accordance with its stored programming instructions, recovers this message by applying the corresponding first key portion and the user's public exponent key to the transformed message.

According to another aspect of the invention, the user's computer, in accordance with its stored programming instructions, transforms a message with the first key portion to form a transformed message. The user's computer is driven by its stored programming instructions to direct the message and the transformed message to another user's computer. The other user's computer, in accordance with its stored programming instructions, recovers the message by applying the corresponding second key portion and public exponent key to the transformed message. The other user's computer may be driven by its stored programming instructions to compare the recovered message to the untransformed message, to confirm that the message was properly recovered, and thereby verify that the message was transformed with the first key portion and thus sent by the user. By reversing the procedure, the user can verify that a message was sent by the other user.

To form joint signatures on a message, the user's computer, in accordance with its stored programming instructions, transforms a message using the first key portion, thereby placing a first signature on the message. The user's computer is driven by its stored programming instructions to direct the transformed message to another user's computer. The other user's computer, in accordance with its stored programming instructions, applies the corresponding second key portion to the transformed, i.e. signed, message received from the user. The application of the second key portion by the other user's computer further transforms the message, thereby placing a second signature on the message. The other user's computer is driven by its stored programming instructions to direct the jointly signed message to a third user of the RSA system. The third user's computer, in accordance with its stored programming instructions, applies the public exponent key associated with the first and second key portions to invert the jointly signed message and thereby verify the joint signatures on the message.

In accordance with a further aspect of the present invention, to establish a session key agreement between first and second user's of an RSA system the certification authority's computer, in accordance with its stored programming instructions, generates a private exponent key and a corresponding public exponent key as described above. The certification authority's computer is driven by its stored programming instructions to direct the public exponent key to the first and second users' programmed computers. The public exponent key may also be directed by the certification authority's computer to other users of the system if so desired. The certification authority's computer is programmed to divide the private exponent key into a first key portion and a corresponding second key portion as previously described and to direct the first key portion only to the first user and the second key portion only to the second user.

The first user's computer, in accordance with its stored programming instructions, generates a number and transforms it with the first key portion to form a first transformed number. The first user's computer is driven by its stored programming instructions to direct the first transformed number the second user's computer. The second user's computer is programmed to recover the first transformed number by applying the second key portion and the public exponent key to the first transformed number.

The second user's computer, in accordance with its stored programming instructions, generates a second number and transforms it with the second key portion and the public exponent key to form a second transformed number. The second user's, computer is driven by its stored programming instructions to direct the second transformed number to the first user's computer. The first user's computer is programmed to recover the second number by applying the first key portion to the second transformed number. The first and second numbers are now known to both users. The first and second user's computers, in accordance with their respective stored programming instructions, compute the product of these numbers to establish a session key which can be used to secure communications between the two users. Thus, agreement on a session key is obtained.

Each private exponent key is comprised of a private exponent and a modulus N and each public exponent key is comprised of a public exponent and the modulus N. The modulus N is the product of a plurality of numbers within a set of large prime numbers and the plurality of numbers used to compute the modulus N are not known to users of the system. The certification authority's computer, users' computers and server computers will normally also include communication devices such as modems, for transmitting and receiving messages via a network, such as the public switched or other type network. It will be understood by those familiar with RSA and other cryptosystems that the public exponent key could be applied by a user having access to either portion of the private exponent key without affecting the security of the system or deviating from the scope of the disclosed invention.

PREFERRED EMBODIMENT OF THE INVENTION

The present invention provides a system and method for improving conventional RSA cryptosystems using a joint signature protocol in which two (or more) parties must collaborate in order to compute the digital signature. No single party can compute such a signature independently. The system and method extend the RSA public-key cryptosystem in a manner which guarantees that cracking the improved system is equivalent to cracking conventional RSA systems. The invention is particularly suited to cases in which one of the parties is a central network server with which a user must interact. The presence of such a server has several important administrative benefits including a central point for auditing and instant key revocation.

Figure 1:
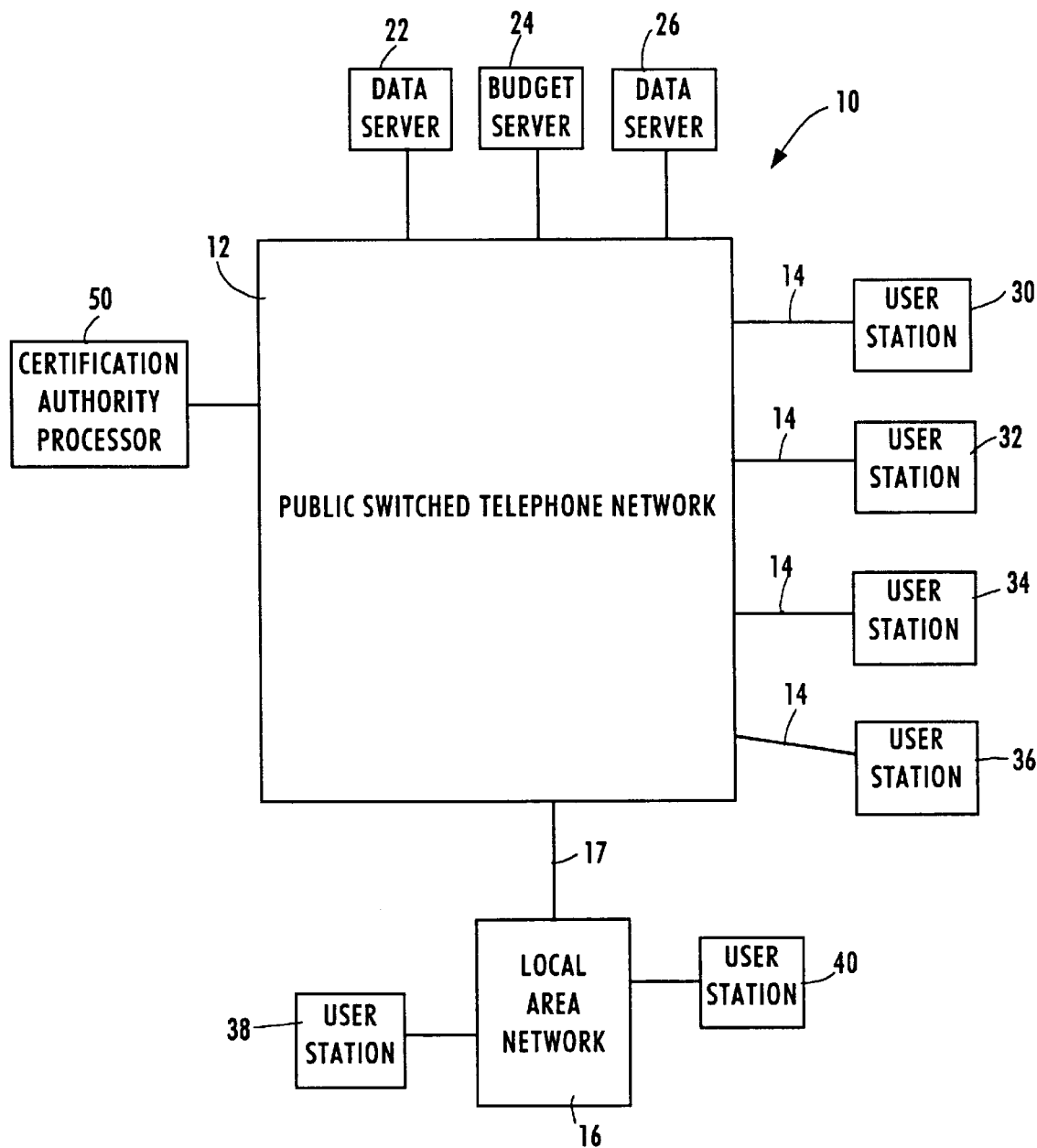
FIG. 1 illustrates an RSA system in accordance with the present invention.

FIG. 1 schematically illustrates a distributed RSA public cryptosystem 10 in accordance with the present invention. The distributed system 10 includes a communications network 12. A plurality of user stations,30–40, are connected to the network 12. If, for instance, the network 12 is the public switched telephone network, the user stations 30–36 could be connected to network 12 via the subscriber lines 14. Another group of user stations, 38 and 40, are connected to the network 12 by the local area network (LAN) 16. The LAN 16 may, for example, be an Ethernet, token ring network or FDDI network. The LAN 16 is itself connected to the network 12, by a subscriber line 17. The user stations may be personal computers, work stations, dumb terminals, or any other device capable of inputting data to and/or receiving data from the network 12.

The distributed system 10 also includes a plurality of servers, 22–26. The servers illustratively contain databases which users at the user stations may wish to access. Each server can also serve as a verifier, if desired. Alternatively, a separate server could be used to perform the verification function.

Figure 2:
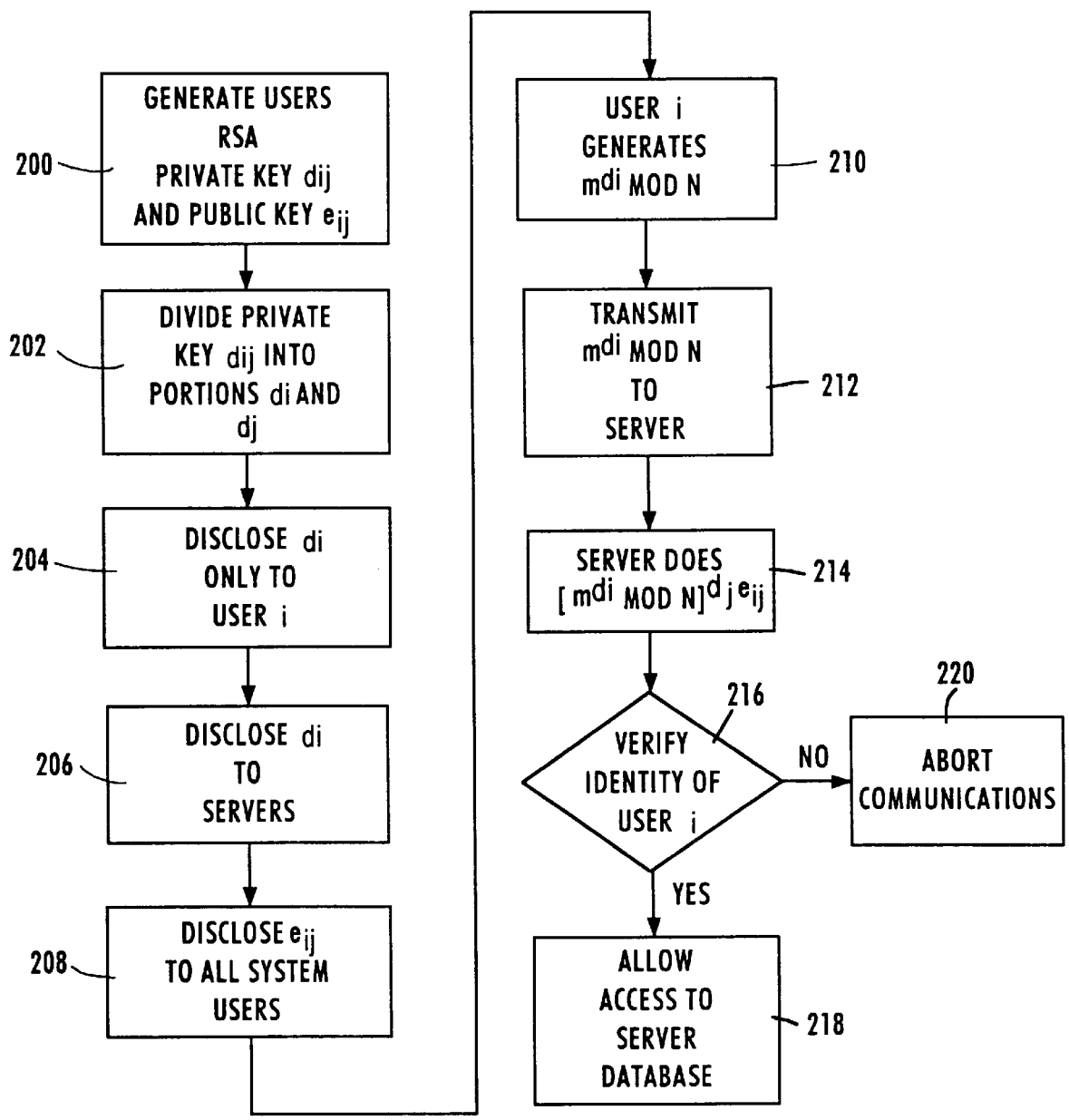
FIG. 2 illustrates party identity verification in accordance with the present invention.

Referring to steps 200–208 of FIG. 2, $e_{ij}$ is the RSA public exponent key of the user i and another user j which could, for example, be servers 22–26. The public exponent key as well as the RSA private exponent key $d_{ij}$ are generated in step 200 such that $d_i d_j e_{ij} = 1 \mod K(N_{ij})$, where $K(N_{ij})$ is either the Carmichael function $\lambda(N)$ or the Euler Totient function $\phi(N)$. The Carmichael function is the least common multiple of (p-1) and (q-1) where N=pq. The Euler Totient function is $\phi(N)=(p-1)(q-1)$. Unlike in conventional RSA systems, neither the user i nor the server j knows the factorization of N (i.e., p and q) or any related function such as $\phi(N)$ or $\lambda(N)$. A certification authority (CA), connected to the system 10 of FIG. 1 by CA processor 50, is the only one who (for a short while) knows p and q while creating, in step 200 and 202, the keys $d_i$, $d_j$ and $e_{ij}$. This factorization is destroyed after the keys are created. The keys are created on processor 50. The private key is divided in step 202 by processor 50 so that the key portion $d_i$ has a bit length which is no longer than fifteen percent of the bit length of the modulus N but not less than 56 bits. Preferably the bit length of $d_i$ is between 56 and 72 bits. Private key portions, $d_i$ and $d_{ij}$ are confidentially and respectively disclosed to user i in step 204 and servers 22–26 in step 206. All system users are provided with public key $e_{ij}$ in step 208.

Consider the case where a first party, e.g., user i, at user station 30, wants to communicate with a second party, e.g. server 22, in order to access a database on the server 22. The user i sends a message to the server 22 informing the server that user i at user station 30 wants to access the database. The server 22 then sends a challenge message m to the user i via network 12 and subscriber line 14.

Verification then proceeds as shown in steps 210–220 of FIG. 2. In step 210, the user i signs the message m using user i's portion of a joint private RSA key $d_i$ to form the signature $s_i=m^{d_i}\bmod N_j$, where N=pq is a modulus which is the product of two large primes p and q. The signed message $s_i$ is then, in step 212, sent by station 30 to the server 22. The server, in step 214, forms the jointly signed message $s_{ij}=s_i^{d_j}\bmod N$, where $d_j$ is the other portion of private exponent key which has been entrusted to each of the servers 22–26. Next, in step 216, the server verifies that $s_{ij}^{e_{ij}}\bmod N=m^{d_id_je_{ij}}\bmod N_{ij}=m$, using public exponent key $e_{ij}$. If the verification fails, the communication between station 30 and server 22 is aborted as indicated in step 220. If user i's identity is verified, access to the data base is allowed as shown in step 218.

Consider next the case where a first party, e.g., user i, at user station 30, wants to authorize a purchasing agent at station 38 to purchase certain products. The purchasing agent is prohibited from proceeding with the purchase unless the procurement is authorized by both user i and the budget department. The budget department stores budget information on server 24. This joint approval requirement is perhaps to ensure that budgeted funds are available before the requested purchase is made. The user i sends a message from station 30 to the server 24 informing the server that user i at user station 30 wants to authorize the purchase of certain products.

Figure 3:
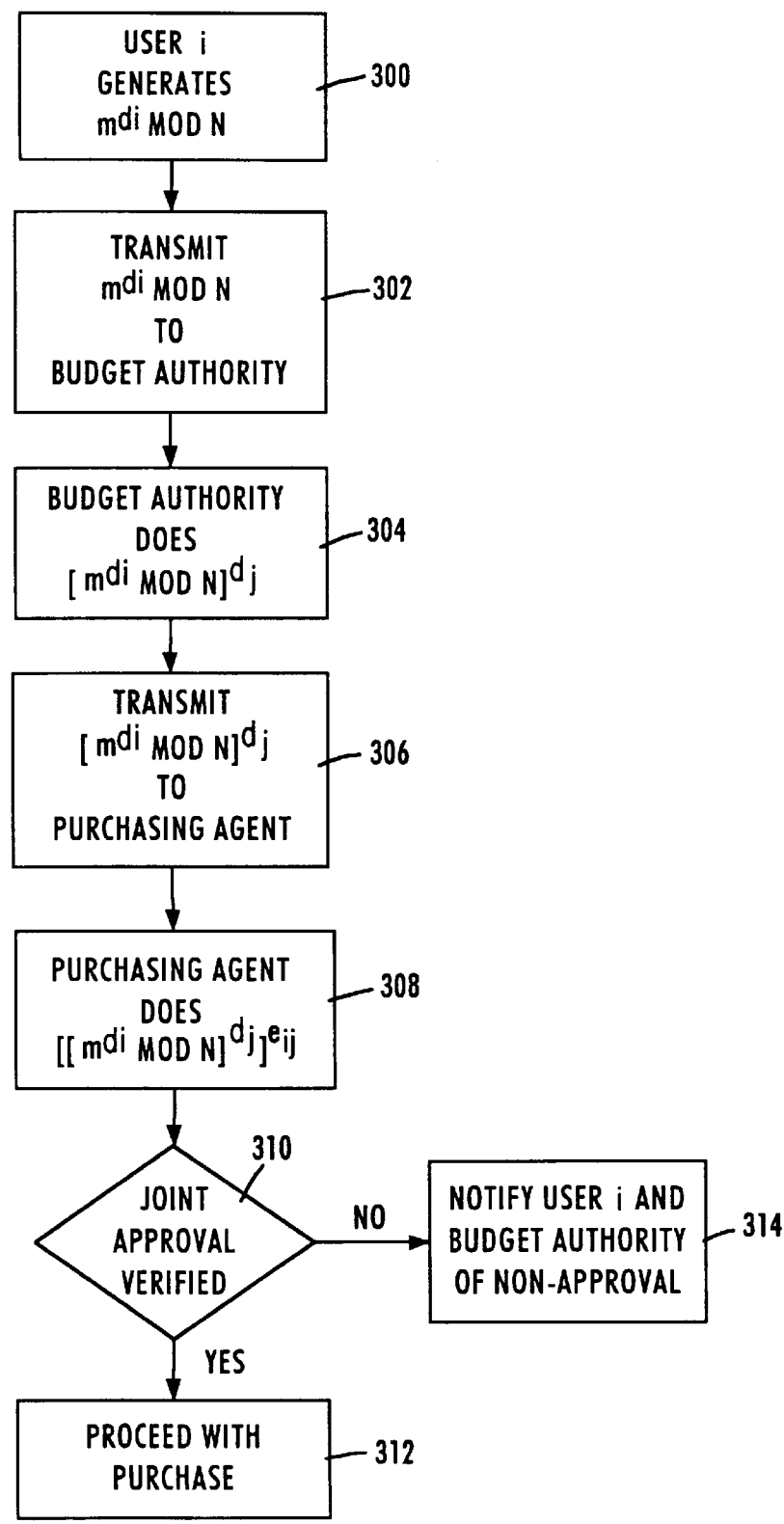
FIG. 3 illustrates joint signature formation in accordance with the present invention.

Joint signature authorization then proceeds as shown in FIG. 3. In step 300, user i, via station 30, signs the authorization m by applying user i's portion, $d_i$, of a joint private RSA key, d, to form the signature $s_i=m_d^{d_i}\bmod N_j$, where N=pq is a modulus which is the product of two large primes p and q. In step 302, the signed message $s_i$ is sent by station 30 to the budget authority's server 24. If sufficient funds have been budgeted, in step 304, the server 24 forms the jointly signed message $s_{ij}=s_i^{d_j}\bmod N_j$, where $d_j$ is the other portion of the private exponent key which has been entrusted to each of the servers 22–26. If there are insufficient funds, the server 24 can, for example, either forward the message to the purchasing agent's station 38 without applying the budget authority's signature $d_j$ or, alternatively, return the message to user i via station 30. If sufficient funds exist, the jointly signed message is forwarded to the purchasing agent. As indicated in step 306, server 24 transmits $m^{d_id_j}\bmod N_{ij}$ to the purchasing agent's station 38 via the necessary networks and communication lines shown in FIG. 1.

The purchasing agent's station retrieves the applicable public key from storage, for example on server 26, and in step 308 applies public exponent key $e_{ij}$ to the received transformed message $m^{d_id_j}\bmod N$ to obtain $s_{ij}^{e_{ij}}\bmod N=m^{d_id_je_{ij}}\bmod N_{ij}=m$. If the message is determined in step 310 to have been properly recovered, the purchasing agent knows that the purchase has been jointly authorized by user i and the budgeting department and will therefore proceed in step 312 with the procurement. If the message is not properly recovered by the application of the public exponent key, the purchasing agent is not authorized to proceed with the purchase and station 38 transmits a notice that the purchase has not been properly authorized back to station 30 and server 24 in step 314.

Figure 4:
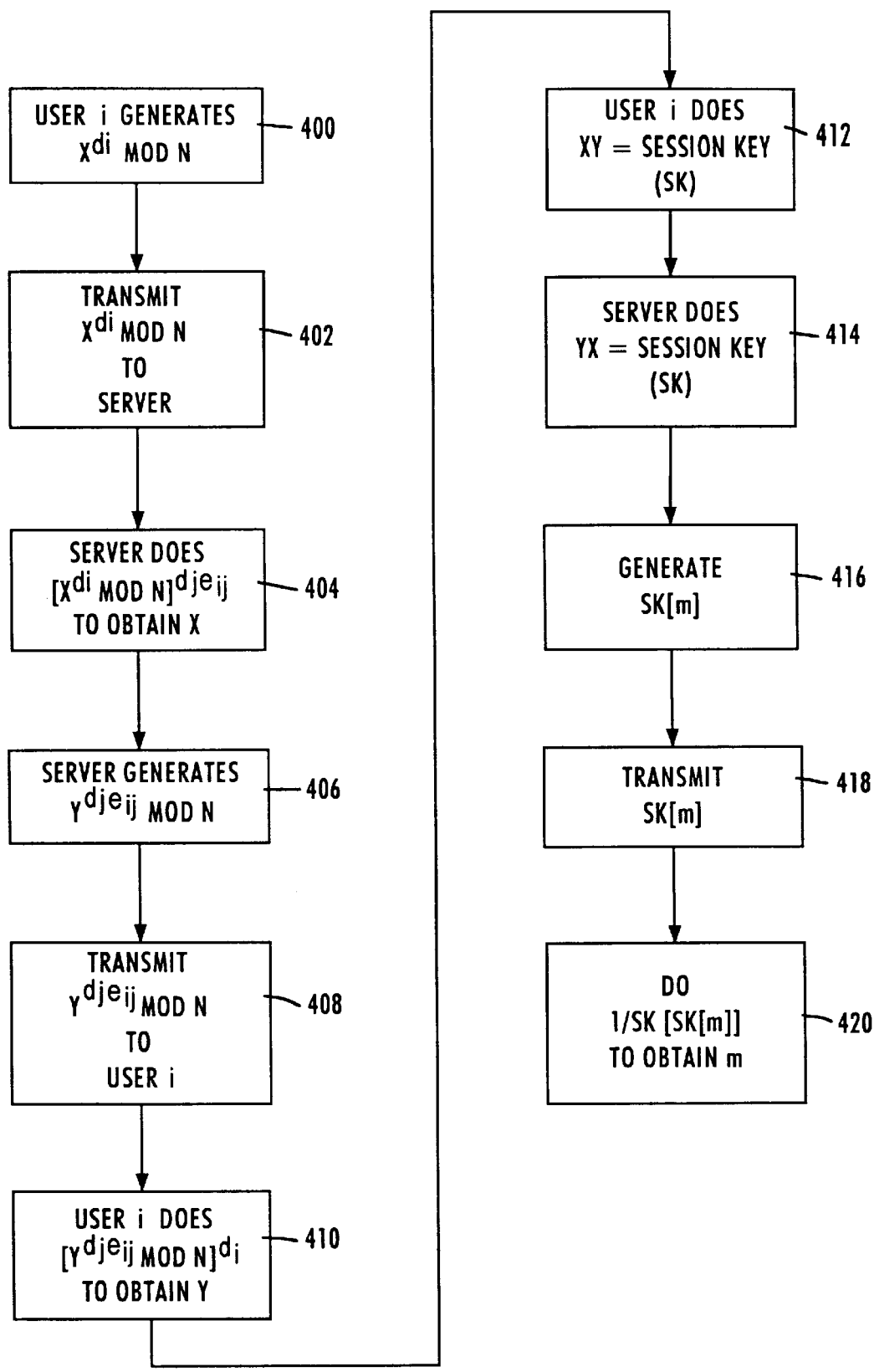
FIG. 4 illustrates a session key agreement in accordance with the present invention.

To establish a secure channel between the user i and the server 22, a session key, sk, is formed by user i and server 22 which is not known to any other party. The session key agreement is established using the private key portions $d_i$ and $d_j$ and the public key $e_{ij}$. As shown in FIG. 4, in step 400 the user i picks a number x and using station 40 signs a message containing the number x by generating the signed message $s_i=x^{d_i}\bmod N_j$. In step 402 $s_i$ is transmitted to server 22 via, for example, station 40 over LAN 16, subscriber line 17 and network 12 of FIG. 1. The server 22, in step 404, exponentiates $s_i$ with its private key portion $d_j$ and with the public key $e_{ij}$ to obtain $x=s_i^{d_je_{ij}}\bmod N=x^{d_id_je_{ij}}\bmod N_{ij}$. In step 406 the server 22 picks a number y and signs a message containing the number y by generating the signed message $s_j=y^{d_je_{ij}}\bmod N_j$. In step 408 $s_j$ is transmitted to the user station 40. The user station 40, in step 410, exponentiates $s_j$ with the user's private key portion $d_i$ to obtain $y=s_jd_i\bmod N_i=y^{d_jd_ie_{ij}}\bmod N_{ij}$.

Now, both the user station 40 and server 22 are in possession of x and y. A session key sk is then formed by both user station 40 in step 412 and server 22 in step 414 by multiplying x and y to obtain sk=xy$\bmod$N. Then, in step 416 a plain text message m is generated and, in step 418, transmitted between station 40 and server 22. The message is encrypted in step 416 using the encipherment function f and the session key sk to obtain the cipher text message c=f(m,sk) prior to transmission. Decryption is performed using a reciprocal function in step 420. Thus, the session key agreement has been established using a private key portion $d_i$ which is of a short length as previously described.

FIGS. 5–10 depict computers suitable for use as the certification authority processor 50, the data and budget servers 22–26, and the user stations 30–40 shown in FIG. 1. The computers are preferably commercially available personal computers or high-powered work stations. Each computer's processor could, for example, be a Pentium™ processor. Any commercially available keyboard and/or mouse and monitor can be utilized. A high-speed network interface, including a high-speed modem, is preferred although not mandatory. The depicted configuration of the computers is exemplary. One or more of the computers could, if desired, also or alternatively include other components (not shown), such as an optical storage medium. Any number configurations could be suitable for implementing the invention so long as sufficient storage capacity and processing capability are provided. All of the computers are depicted as having similar hardware configurations, although this is not mandatory. For example, as will be well understood by the skilled artisan, it may be desirable for components of the respective computers to have attributes such memory storage capacity, data transmission rates and processing speeds which differ.

Each of the computers differ in their respective computer programming instructions so that each of the computers is uniquely driven to operated in accordance with the present invention. That is, the functionality of each of the computers described with reference to FIGS. 5–10 varies from that of the other computers due to the programming instructions which drive its operation. It will also be recognized by those skilled in the art that only routine programming is required to implement the instructions disclosed herein on the described computers such that the computers are driven by the programming to operate in accordance with the invention.

Figure 5:
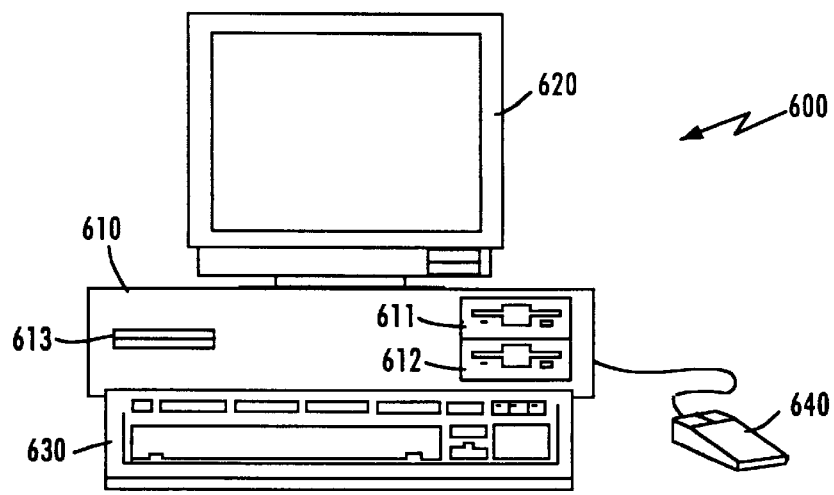
FIG. 5 depicts a computer suitable for use as the certification authority processor depicted in FIG. 1.
Figure 6:
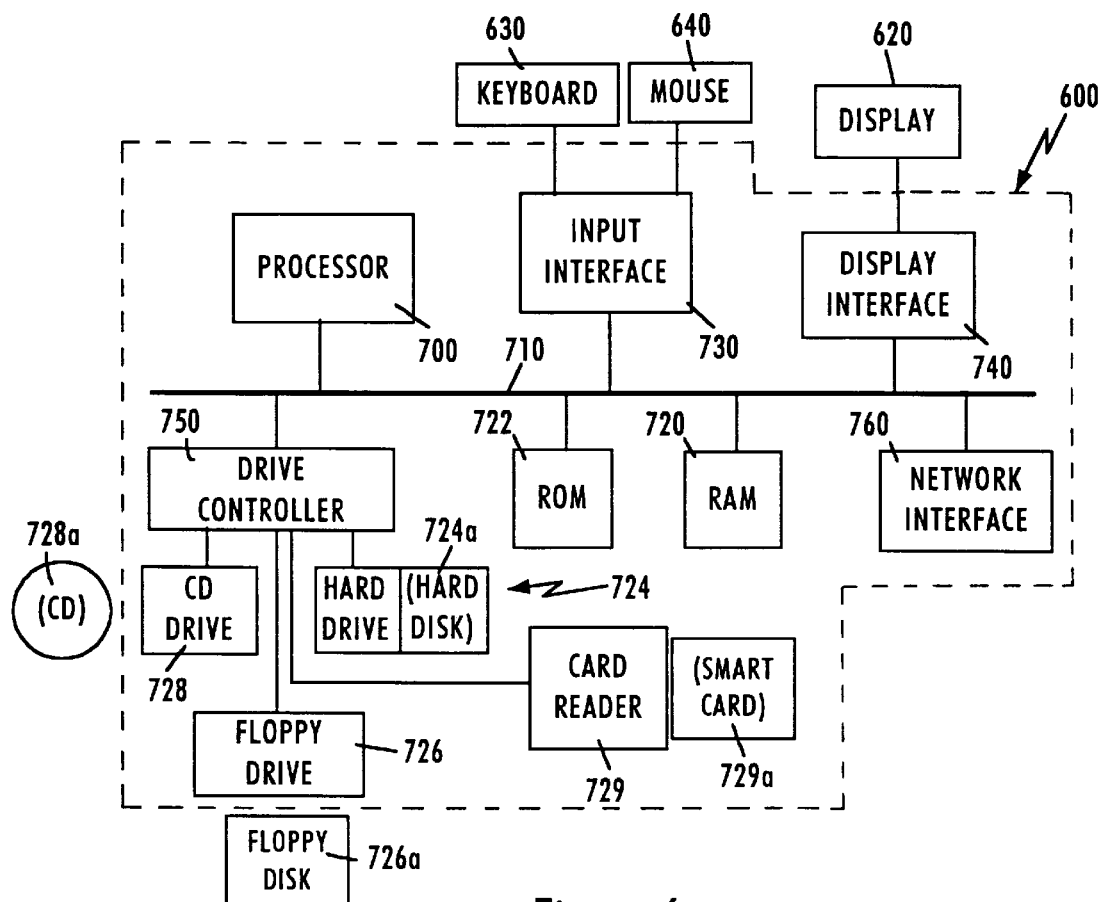
FIG. 6 is an exemplary block diagram of the computer depicted in FIG. 5.

To avoid unnecessary duplication the computers depicted in FIGS. 5–10 will, in general, be described only with reference to FIGS. 5 and 6. It should be understood that the corresponding components and their operation in the computers depicted in FIGS. 7–10 will be similar. Further, since the computer components and configurations are conventional, routine operations performed by the depicted components will generally not be described, such operations being well understood in the art.

Preferably, each of the computers stores its unique programming instructions on its ROM or hard disk. Long term data and long portions of crypto-keys, such the long segment of a divided private crypto-key portion and the associated public crypto-key portion, are preferably stored on the computer's hard disk. Short term data which is required to be processed or otherwise utilized more than once is preferably stored on the RAM.

Referring now to FIGS. 5 and 6, the computer 600 includes a main unit 610 with slots 611, 612 and 613, respectively provided for loading programming or data from a floppy disc 726a, CD 728a and smart card 729a onto the computer 600. The computer 600 also includes a keyboard 630 and mouse 640 which serve as user input devices. A monitor display 620 is also provided to visually communicate information to the user.

As depicted in FIG. 6, The computer 600 has a main processor 700 which is interconnected via bus 710 with various storage devices including RAM 720, ROM 722 and hard drive 724, all of which serve as storage medium on which computer programming or data can be stored for access by the processor 700. The main processor 700 is also interconnected via bus 710 with various other storage devices such as the floppy disc drive 726, the CD drive 728 and the card reader 729 which are capable of being controlled by drive controller 750 to read computer programming or data stored on a floppy disc 726a, CD 728a or smart card 729a when inserted into the appropriate slot 611, 612 or 613 in the unit 610. By accessing the stored computer programming the processor 700 is driven to operate in accordance with the present invention.

The processor 700 is also operatively connected to the keyboard 630 and/or mouse 640, via input interface 730. The display monitor 620 is also interconnected to the processor 700, via display interface 740, to facilitate the display of information to the user. The network interface 760 is provided to interconnect the processor 700 to the network 12 depicted in FIG. 1 and accordingly allow communications between the computer 600 and other network devices. Since the computer 600 serves as the certification authority processor 50 of FIG. 1, the network interface allows communications with network servers 22–26 and user stations 30–40 of FIG. 1.

The inter-operation of the various components of the computers depicted in FIGS. 5–10 in implementing the steps described above with reference to FIGS. 2–4 will now be described. Referring to FIGS. 5 and 6, computer 600 serves as the certification authority processor 50 depicted in FIG. 1. Upon request from an authorized cryptosystem user, which is received from one of the servers 22–26 or user stations 30–40 shown in FIG. 1 via the network interface 760 and directed to the processor 700 via bus 710, the processor, in accordance with instructions received from computer programming stored for example on ROM 722, generates the public exponent key $e_{ij}$ and the private exponent key $d_{ij}$, as described in step 200 of FIG. 2. The programming instructions on the ROM 722 then drive the processor 700 to divide the private key $d_{ij}$ into a first private key portion $d_i$ and a second private key portion $d_j$, as described in step 202. As previously discussed, the first private key portion $d_i$ has a bit length which is no longer than fifteen percent of the bit length of the associated modulus N but not less than 56 bits. The processor 700 is now directed by the stored programming instructions to store the pubic key $e_{ij}$ via the drive controller 750 on, for example, the hard disk 724a inserted in hard drive 724. The processor 700 is also driven to direct the network interface 760 to transmit the first private key portion $d_i$ to the requesting user via the public switch network 12 and, if applicable, local area network 16 depicted in FIG. 1. The processor 700 also directs network interface 760 to transmit the second private key portion $d_j$ to one or more of the servers 22–26, as described in step 206 of FIG. 2.

The processor 700 next will be driven by the programming instructions stored on ROM 722 to direct the network interface to transmit the public key $e_{ij}$ to all other system users as discussed in step 208 of FIG. 2.

Figure 7:
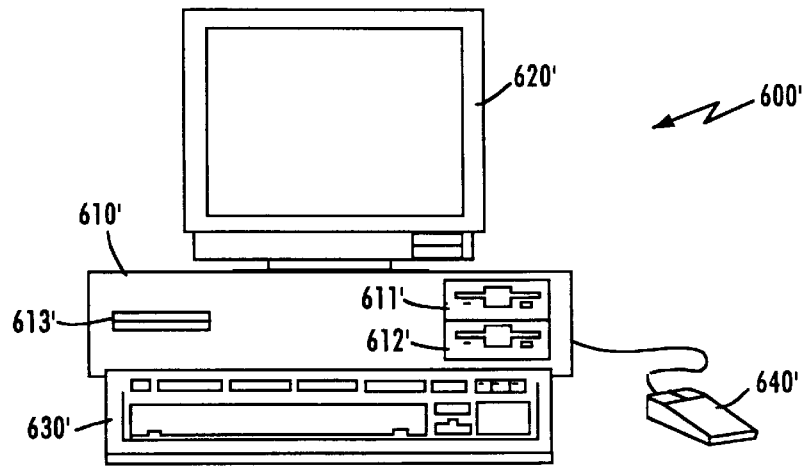
FIG. 7 depicts a computer suitable for use as a data or budget server depicted in FIG. 1.
Figure 8:
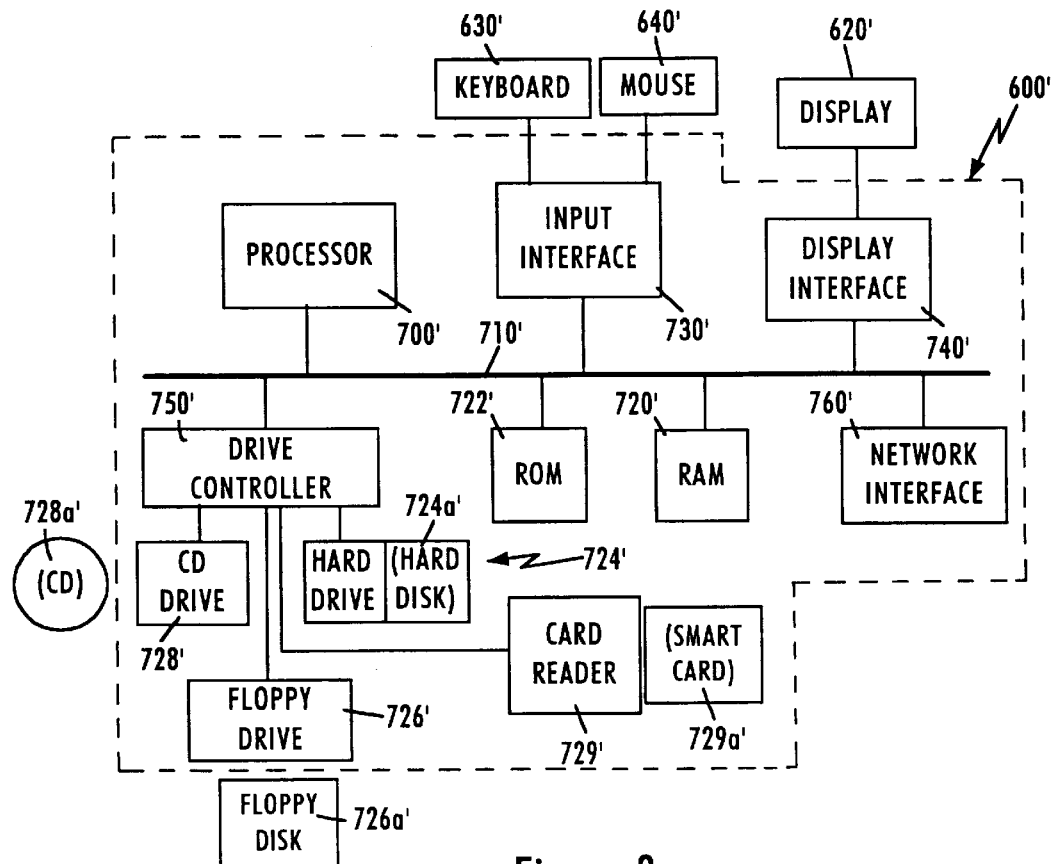
FIG. 8 is an exemplary block diagram of the computer depicted in FIG. 7.

Referring now to FIGS. 7 and 8, the first party, i.e. user i, is at user station 30 and wants to communicate with a second party, (e.g. server 22), in order to access a database on the server 22. User i enters a message via the keyboard 630' or mouse 640– which is transmitted to the processor 700' via the input interface 730' and bus 710' and displayed on the display 620' via display interface 740'. Entering a further command via the keyboard 630' or mouse 640', the processor 700', in accordance with the stored programming instructions for example on ROM 722', signs the message m using user i's portion of a joint private RSA key $d_i$, as described in step 210 of FIG. 2. The user i's portion of the joint private RSA key $d_i$ is preferably input by the user i via keyboard 630' and is not stored or only temporarily stored for a short period of time on RAM 720'. Processor 700' is next driven by the programming stored on ROM 722' to direct the network interface 760' to transmit the signed message to the server 22, as described in step 212.

Figure 9:
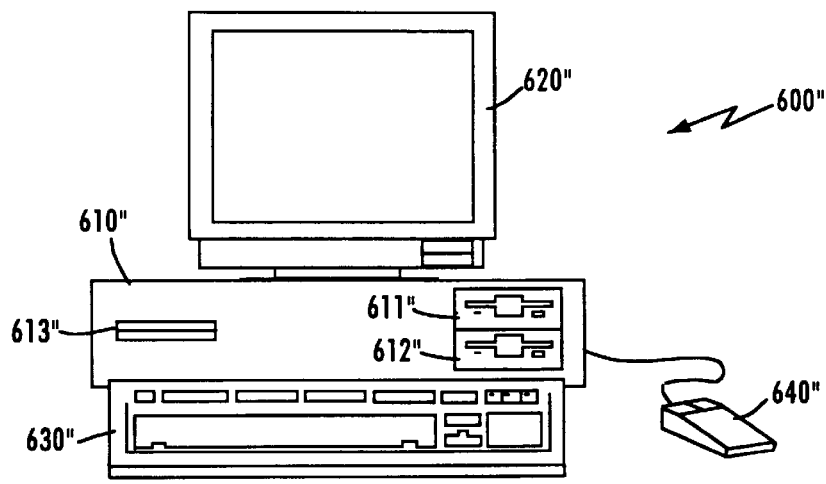
FIG. 9 depicts a computer suitable for use as a user station depicted in FIG. 1.
Figure 10:
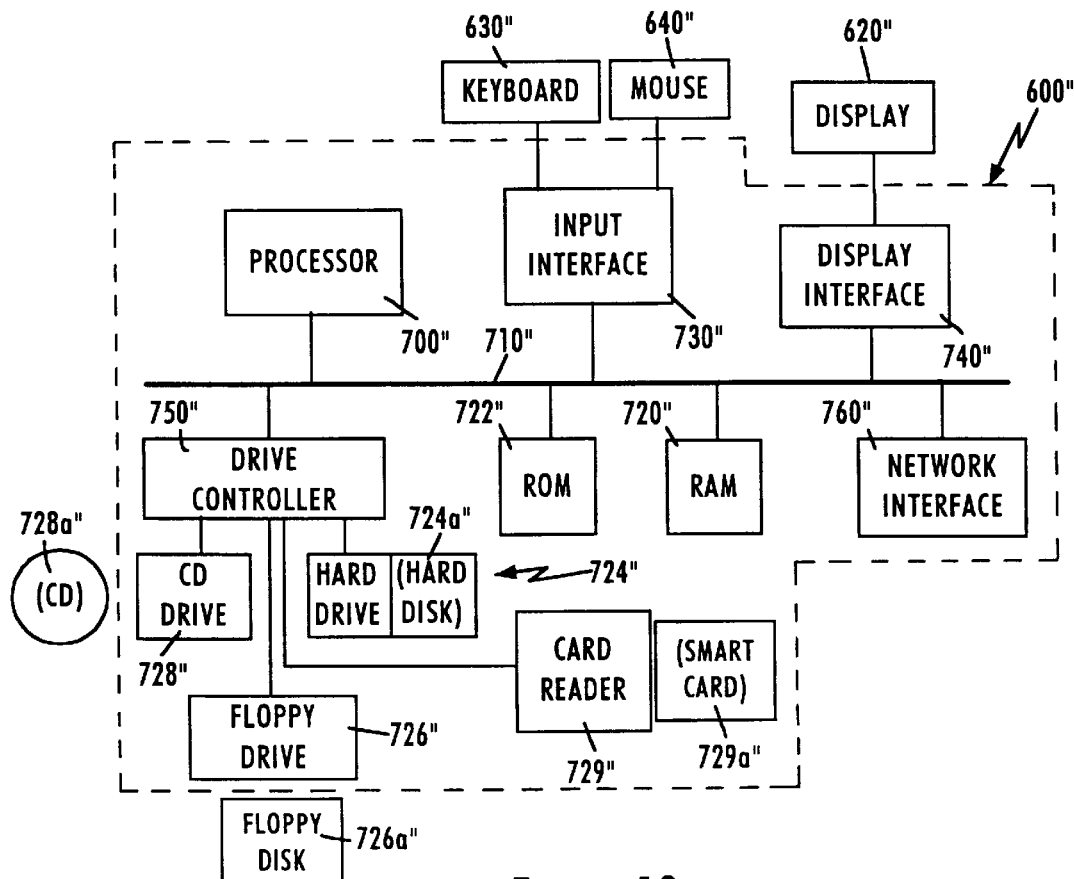
FIG. 10 is an exemplary block diagram of the computer depicted in FIG. 9.

Turning now to FIGS. 9 and 10, the server 22 is represented by the computer 600". The signed message is received via network interface 760" and directed over the bus 710" to the processor 700". The processor 700", in accordance with programming instructions stored for example on ROM 722' forms a jointly signed message $s_{ij}$ by applying the other portion of user i's private exponent key $d_j$, which is retrieved from, for example, RAM 720" or hard disk 724a", as described in step 214 of FIG. 2.

Processor 700" also retrieves from RAM 720" or hard disk 724a" user i's public exponent key $e_{ij}$ and applies this to the jointly signed message $s_{ij}$ to verify that the message was properly signed by user i, as described in step 216 of FIG. 2. Processor 700" aborts communications, as described in step 220 of FIG. 2 if the verification fails. If user i's identity is verified by processor 700', access is allowed to the database as indicated in step 218 of FIG. 2.

Considering next the case where a first party, e.g. user i at station 30, wants to authorize a purchasing agent at station 38 to purchase certain products, and referring again to FIGS. 7 and 8, user i inputs an authorization via the keyboard 630' or mouse 640' to the processor 700'. The authorization message m will normally be displayed on the display 620' and may be temporarily stored in RAM 720' or stored for a longer period on hard disk 724a. User i then enters on keyboard 630' his/her private key $d_i$, of the joint private RSA key, $d_i$. The key portion $d_i$ is transmitted to the processor 700' via input interface 730' and bus 710'. The key portion $d_i$ may be temporarily stored on RAM 720' or not stored at all. Processor 700' signs the authorization message m using key portion $d_i$, as described in step 300 of FIG. 3. Processor 700', in accordance with the programming instructions stored on ROM 722', directs the network interface 760' to transmit the signed message to server 22 via the network 12, as described in step 302 of FIG. 3.

Server 24 is represented by a computer as depicted in FIGS. 9 and 10. Accordingly, the transmitted message is received by a network interface 760" and sent via bus 710" to the processor 700". The signed message is also temporarily stored on the RAM 720". The processor 700", in accordance with the programming instructions stored on ROM 722", forms the jointly signed message $s_{ij}$ by retrieving the other portion of the private exponent key which is stored on, for example, RAM 720' or hard disk 724a' and applying it to the signed message $s_i$ if the authorization is to be given, as described in step 304 of FIG. 3. The processor 700" directs the network interface 760" to transmit the jointly signed message $s_{ij}$ to the station 38 via communications networks 12 and 16, as described in step 306 of FIG. 3.

Referring now to FIGS. 7 and 8, the user station 38 is represented by the computer 600'. The jointly signed message $s_{ij}$ is received by the network interface 760' and forwarded to the processor 700' via bus 710'. The processor 700', in accordance with its stored programming instructions, retrieves the public exponent key $e_{ij}$ from the hard disk 724a' and applies it to the jointly signed message $s_{ij}$, as described in step 308 of FIG. 3. If the message is determined by the processor 700' to have been properly recovered, as described in step 310 of FIG. 3, a corresponding notice may be displayed on the display 620' to notify the purchasing agent to proceed with the purchase, as described in step 312 of FIG. 3. Alternatively, processor 700', in accordance with the programming instructions stored on ROM 722', will direct the network interface 760' to notify stations 30 and 24 of non-approval of the purchase, as described in step 314 of FIG. 3.

Referring again to FIGS. 7 and 8, the establishment of a session key will now be described with reference also to FIG. 4. User i, at user station 40, inputs a command to the processor 700' via keyboard 630' or mouse 640' to establish a session key. The processor 700', in accordance with the programming instructions stored on ROM 722', randomly selects or preferably generates a number x which may be displayed on the display 620' and is stored on RAM 720'. User i now enters its private key portion $d_i$ via the keyboard 630'. The processor 700', in accordance with its stored programming instructions, applies the key portion $d_i$ to a message containing the generated or selected number x to form a signed message $s_i$ as discussed in step 400 of FIG. 4. The processor 700', as described in step 402, then directs the network interface 760' to transmit the signed message $s_i$ to the server 22, which is represented by the computer 600" depicted in FIGS. 9 and 10. Processor 700' also directs the generated or selected number to be stored in the RAM 720'.

Referring now to FIGS. 9 and 10, the network interface 760" receives the signed message and forwards it to the processor 700" via the bus 710". The processor 700", in accordance with the programming stored on ROM's 722", retrieves the other private key portion $d_j$ from storage on RAM 720" or hard disk 724a" and the public key $e_{ij}$ from hard disk 724a" and applies it, as discussed in step 404 of FIG. 4, to obtain the number x. Processor 700" is now directed by its stored programming to select or preferably generate a number y. The number may be displayed on the display 620". Processor 700" stores the number y in RAM 720" and also signs a message including the number y with the private key portion $d_j$ and the public key $e_{ij}$. Processor 700" next directs the network interface 760" to transmit the signed message via the networks 12 and 16 to the user station 40. Processor 700" is also driven by the stored programming instructions to multiply the numbers x and y to form a session key, sk, which is preferably stored in RAM 720".

Referring again to FIGS. 7 and 8, user station 40 represented by computer 600' receives the signed message from the server 22 via the network interface 760'. The processor 700' may drive a notice to be displayed on display 620' if user i must re-input private key portion $d_i$ or will alternatively retrieve private key portion $d_i$ from RAM 720' and apply it to the signed message from server 22, as described in step 410, to obtain the number y. The processor 700' is next driven by its stored programming instructions to retrieve the number x from storage and multiply it by the number y to form the session key, as described in step 412 of FIG. 4. The session key, sk, may be stored on the RAM 720'.

A message can now be inputted, for example, via keyboard 630' by user i and encrypted with the session key, sk, by processor 700', as described in step 416 of FIG. 4. The processor then drives the network interface 760' to transmit the encrypted message via the networks 12 and 16 to the data server 22.

Referring again to FIGS. 9 and 10, the encrypted message is received via network interface 760" and forwarded to processor 700". Processor 700", in accordance with the programming instructions stored on ROM 722", retrieves the session key, sk, from RAM 720" and applies it to decrypt the received message, as described in step 420 of FIG. 4.

The above-described computer and computer programming instructions have a number of very significant advantages. The user i uses a small secret key $d_i$ which is of the order $O(n^{log(n)/loglog(n)})$, where n=log N and is a security parameter. For example, if the modulus N has 512 bits, the private key portion $d_i$ can be between 56 and 72 bits. A key of such a length, approximately 8 characters, is short enough to be easily memorize by a user and, if properly chosen, long enough to make off-line password guessing attacks impractical. The length of the public key $e_{ij}$ is approximately equal to log ($\lambda$N). The servers 22–26 are required to perform only one exponentiation to verify the user's identity or form a joint signature on a document. The computer and programming instructions are especially suitable for use in the case where the user i must memorize $d_i$ because, for example, no smart card for storing $d_i$ is available. Further, the computer and computer programming instructions provide secure controlled access to the servers 22–26. This is because full RSA security is provided even though $d_i$ is only 56 to 72 bits in length. Thus it is extremely difficult to break through the system's security in a timely fashion. However, it will be understood that reducing the size of the private key portion $d_i$ below the relationship discussed above, will result in a system which offers less security than conventional RSA systems.

As described above, the present invention provides a programmed computer and computer programming instructions for improving conventional RSA public cryptosystems so that the user is only required to use a short secret key while still retaining system security equivalent to that of conventional RSA systems. Using the described computer or computer programming instructions, the identity of the user can be easily verified. The joint signature of documents by two or more users is also facilitated. Additionally, the described computer and computer programming instructions enhance the users' ability to obtain session key agreement.

I claim:

1. An article of manufacture for use in a cryptosystem, comprising:

computer readable storage medium; and computer programming stored on said storage medium;

wherein said stored computer programming is configured to be readable from said computer readable storage medium by a computer and thereby cause said computer to operate so as to:

generate a private exponent key, having an associated modulus N of a predetermined bit length, and a corresponding public exponent key;

divide said private exponent key into a first private key portion, having a bit length of no greater than fifteen percent of the bit length of the associated modulus N but not less than 56 bits, and a second private key portion;

direct said first private key portion to a first user; and direct said second private key portion to a selected one or more other users of the RSA system.

2. An article of manufacture according to claim 1, wherein said private exponent key is comprised of a private exponent and the modulus N, the modulus N is a product of two large prime numbers, and said public exponent key is comprised of a public exponent and the modulus N.

3. An article of manufacture according to claim 1, wherein said bit length of said first private key portion is between 56 and 72 bits.

4. A programmed computer for use in a cryptosystem, comprising:

a processor configured to generate a private exponent key, having an associated modulus N of a predetermined bit length, and a corresponding public exponent key, to divide said private exponent key into a first private key portion, having a bit length of no greater than fifteen percent of the bit length of the associated modulus N but not less than 56 bits, and a second private key portion, to direct said first private key portion to a first user, and to direct said second private key portion to a selected one or more other users of the RSA system; and storage medium configured to store the public exponent key.

5. A programmed computer according to claim 4, wherein said private exponent key is comprised of a private exponent and the modulus N, the modulus N is a product of two large prime numbers, and said public exponent key is comprised of a public exponent and the modulus N.

6. A programmed computer according to claim 4, wherein said bit length of said first private key portion is between 56 and 72 bits.

7. An article of manufacture for use in a cryptosystem in which each user is associated with a private exponent key having an associated modulus N of a predetermined bit length, and a corresponding public exponent key, said private exponent key being divided into two private key portions, one private key portion being available to a first user, and the other private key portion being available to a second user of the cryptosystem, comprising:

computer readable storage medium; and computer programming stored on said storage medium;

wherein said stored computer programming is configured to be readable from said computer readable storage medium by a computer and thereby cause said computer to operate so as to:

transform a message from the first user with a first private key portion having a bit length no greater than fifteen percent of the modulus N but not less than 56 bits; and direct the transformed message to the second user, wherein the message is recoverable by applying a second private key portion and public exponent key thereto to verify that the message is from the first user.

8. An article of manufacture according to claim 7, wherein said stored computer programming is configured to be readable from said computer readable storage medium by the computer to thereby cause said computer to operate so as to:

recover a second message from the second user, encrypted with said second private key portion, by applying the first private key portion and public exponent key to the encrypted second message, to verify that the message is from the second user.

9. An article of manufacture according to claim 8, wherein said stored computer programming is configured to be readable from said computer readable storage medium by the computer to thereby cause said computer to operate so as to:

compare the recovered second message with another message to make said verification.

10. An article of manufacture according to claim 7, wherein said bit length of said first private key portion is between 56 and 72 bits.

11. An article of manufacture according to claim 7, wherein transformation of the message with the first private key portion serves as a signature of the first user on the message and said stored computer programming is configured to be readable from said computer readable storage medium by the computer to thereby cause said computer to operate so as to:

invert a jointly signed message, said jointly signed message having been formed by a further transformation of the transformed message with a second private key portion which serves a signature of the second user on said message, by applying thereto said public exponent key to verify the signatures of the first and the second users on the message.

12. A programmed computer for use in a cryptosystem in which each user is associated with a private exponent key having an associated modulus N of a predetermined bit length, and a corresponding public exponent key, said private exponent key being divided into two private key portions, one private key portion being available to a first user, and another private key portion being available to a second user of the cryptosystem, comprising:

a processor configured to transform a message from the first user with a first private key portion having a bit length no greater than fifteen percent of the modulus N but not less than 56 bits, and to direct the transformed message to the second user, wherein the message is recoverable by applying a second private key portion and public exponent key thereto to verify that the message is from the first user; and a storage medium configured to store the public exponent key.

13. A programmed computer according to claim 12, wherein said processor is further configured to recover a second message from the second user, encrypted with said second private key portion, by applying the first private key portion and public exponent key to the encrypted second message, to verify that the message is from the second user.

14. A programmed computer according to claim 13, wherein said processor is further configured to compare the recovered second message with another message to make said verification.

15. A programmed computer according to claim 12, wherein said bit length of said first private key portion is between 56 and 72 bits.

16. A programmed computer according to claim 12, wherein transformation of the message with the first private key portion serves as a signature of the first user on the message and said processor is further configured to:

invert a jointly signed message, said jointly signed message having been formed by a further transformation of the transformed message with a second private key portion which serves as a signature of the second user on said message, by applying thereto said public exponent key to verify the signatures of the first and the second users on the message.

17. An article of manufacture for use in a cryptosystem in which each user is associated with a private exponent key and a corresponding public exponent key, said private exponent key being divided into two private key portions, one private key portion being available to a first user, and the other private key portion being available to a second user of the cryptosystem, and the public exponent key being available to said first and second users, comprising:

computer readable storage medium; and computer programming stored on said storage medium;

wherein said stored computer programming is configured to be readable from said computer readable storage medium by a computer and thereby cause said computer to operate so as to:

transform a first number with a first private key portion having a bit length of (i) no greater than fifteen percent of a bit length of an associated modulus N and (ii) not less than 56 bits;

direct the transformed first number to the second user, wherein the first number is recoverable by applying a second private key portion and public exponent key thereto;

recover a second number, transformed with the second private key portion, by applying said first private key portion and the public exponent key to the transformed second number;

multiply the first number and the second number to form a joint symmetric session encryption key; and transform a communication between said first user and said second user with said session encryption key.

18. An article of manufacture according to claim 17, wherein said first user key portion has a bit length between 56 and 72 bits.

19. A programmed computer for use in a cryptosystem in which each user is associated with a private exponent key and a corresponding public exponent key, said private exponent key being divided into two private key portions, one private key portion being available to a first user, and the other private key portion being available to a second user of the cryptosystem, and the public exponent key being available to said first and second users, comprising:

a processor configured (i) to transform a first number with a first private key portion having a bit length of no greater than fifteen percent of a bit length of an associated modulus N and not less than 56 bits, (ii) to direct the transformed first number to the second user, wherein the first number is recoverable by applying a second private key portion and public exponent key thereto, (iii) to recover a second number, transformed with the second private key portion, by applying said first private key portion and the public exponent key to the transformed second number, (iv) to multiply the first number and the second number to form a joint symmetric session encryption key, and (v) to transform a communication between said first user and said second user with said session encryption key; and a storage medium configured to store the session encryption key.

20. A programmed computer according to claim 19, wherein said first user key portion has a bit length between 56 and 72 bits.

\* \* \* \* \*